United States Patent
Klassen et al.

(10) Patent No.: US 8,539,365 B2
(45) Date of Patent: *Sep. 17, 2013

(54) IM CONVERSATION MANAGEMENT

(75) Inventors: Gerhard Dietrich Klassen, Waterloo (CA); Craig Dunk, Guelph (CA); Lawrence Edward Kuhl, Waterloo (CA); Christopher R. Wormald, Kitchener (CA)

(73) Assignee: BlackBerry Limited, Waterloo (CA)

( * ) Notice: Subject to any disclaimer, the term of this patent is extended or adjusted under 35 U.S.C. 154(b) by 28 days.

This patent is subject to a terminal disclaimer.

(21) Appl. No.: 13/013,622

(22) Filed: Jan. 25, 2011

(65) Prior Publication Data

US 2011/0119599 A1    May 19, 2011

Related U.S. Application Data

(63) Continuation of application No. 11/402,139, filed on Apr. 12, 2006, now Pat. No. 7,890,875.

(51) Int. Cl.
*G06F 3/00* (2006.01)

(52) U.S. Cl.
USPC .......................... 715/758; 715/751; 715/753

(58) Field of Classification Search
None
See application file for complete search history.

(56) References Cited

U.S. PATENT DOCUMENTS

| | | | |
|---|---|---|---|
| 6,330,589 B1 * | 12/2001 | Kennedy | 709/206 |
| 6,778,834 B2 | 8/2004 | Laitinen et al. | |
| 7,188,140 B1 * | 3/2007 | Greenspan et al. | 709/204 |
| 7,328,242 B1 * | 2/2008 | McCarthy et al. | 709/204 |
| 7,512,655 B2 * | 3/2009 | Armstrong et al. | 709/205 |
| 8,020,105 B1 * | 9/2011 | Lemay et al. | 715/746 |
| 2002/0019827 A1 * | 2/2002 | Shiman et al. | 707/200 |
| 2002/0026487 A1 | 2/2002 | Ogilvie et al. | |
| 2002/0075305 A1 | 6/2002 | Beaton et al. | |
| 2002/0143877 A1 | 10/2002 | Hackbarth et al. | |
| 2002/0160805 A1 * | 10/2002 | Laitinen et al. | 455/550 |
| 2003/0163537 A1 * | 8/2003 | Rohall et al. | 709/206 |
| 2004/0017396 A1 | 1/2004 | Werndorfer et al. | |
| 2004/0024616 A1 | 2/2004 | Spector et al. | |
| 2004/0054737 A1 | 3/2004 | Daniell | |

(Continued)

FOREIGN PATENT DOCUMENTS

EP    1447949 A1    8/2004

OTHER PUBLICATIONS

RFC 2778—A Model for Presence and Instant Messaging; The Internet Society; Feb. 2000; Available from http://www.faqs.org/rfcs/rfc2778.html.

(Continued)

*Primary Examiner* — Stephen Alvesteffer
(74) *Attorney, Agent, or Firm* — Brett J. Slaney; Blake, Cassels & Graydon LLP

(57) ABSTRACT

A method and apparatus for managing IM conversations is provided. In response to idle time and, preferably, read message status, particular current conversations are removed from a list of current conversations. The removed conversations may be moved to an archive which may be automatically maintained in response to size constraints. An archive interface is facilitated to review conversations, save all or portions thereof, delete, etc. The archived conversations are preferably associated with the contact for the conversation to show a history of conversations.

27 Claims, 7 Drawing Sheets

(56) References Cited

U.S. PATENT DOCUMENTS

| | | | |
|---|---|---|---|
| 2004/0162882 A1* | 8/2004 | Mora | 709/207 |
| 2005/0050462 A1 | 3/2005 | Whittle et al. | |
| 2005/0198545 A1 | 9/2005 | Wieck et al. | |
| 2006/0085502 A1* | 4/2006 | Sundararajan et al. | 709/204 |
| 2006/0155785 A1 | 7/2006 | Berry et al. | |
| 2007/0186172 A1* | 8/2007 | Sego et al. | 715/753 |

OTHER PUBLICATIONS

Angwin, J.; "Talk is Cheap: AOL's Buddy List Sparks Race to Harness the Power of 'Presence'"; Mar. 23, 2001; The Wall Street Journal; http://home.uchicago.edu/~rposner/wallst2.htm.

Kalabic, F.; Search Report from corresponding European Application No. 06112560.5; search completed Sep. 21, 2006.

* cited by examiner

IM CONVERSATION MANAGEMENT

CROSS REFERENCE TO RELATED APPLICATIONS

This application is a continuation of U.S. patent application Ser. No. 11/402,139 filed on Apr. 12, 2006, the contents of which are incorporated herein by reference.

FIELD OF THE INVENTION

The present application relates to a user interface for a messaging application and more particularly for method and apparatus for Instant Messaging (IM) conversation management.

BACKGROUND OF THE INVENTION

Communication devices such as personal computers, wireless mobile telephones, personal data assistants, etc. often provide data communication abilities to users. One currently popular form of such communication is Instant Messaging (IM) facilitated by an application having a graphical user interface (GUI) whereby two or more users of different communication devices can engage in a conversational data communication exchange.

In fact, many applications permit a user of a particular communication device to simultaneously conduct more than one conversation with different users or groups of users of other communication devices. A set of active conversations may grow quite large as new conversations are started without closing out existing conversations.

Conversations are often displayed to the user in a list for navigating and selecting a particular conversation to engage in communication. A large list of conversations, particularly on a communication device having a relatively small display, limits the effectiveness of the GUI because it can take longer for the user to locate a desired conversation. Further, a long list limits the ability of the GUI to apply the list to various interface features such as a menu for quick access etc. Many conversations may become old and no longer relevant.

A solution to one or more of these needs is therefore desired.

BRIEF DESCRIPTION OF THE DRAWINGS

In order that the subject matter may be readily understood, embodiments are illustrated by way of examples in the accompanying drawings, in which.

DETAILED DESCRIPTION

Persons of ordinary skill in the art will appreciate that teachings herein are applicable to messages received via wired or wireless communication and though a wireless communication device and network including wireless communication capabilities are discussed in the examples, no limitations should be imposed.

There is provided an IM application with conversation management whereby a conversation is removed from a user's set of current conversations if the conversation is idle for a defined amount of time and, preferably but not necessarily, has no unread messages. Conversations removed may be moved to an archive of old conversations which archive may be reviewed.

Conversations may be removed from the archive automatically, for example, once the size of the archive exceeds a defined limit (or the device is in low memory). Preferably but not necessarily, the oldest conversation is deleted first.

Archived conversations may be accessible in one or more ways. A conversation may be available for review from a full list, or viewed by selecting the participant in the contact list and opening a conversation history.

In accordance with a further preference, if the user wants to save text from a conversation the archive could be adapted to provide the ability for the user to save a conversation indefinitely.

Figure 1:
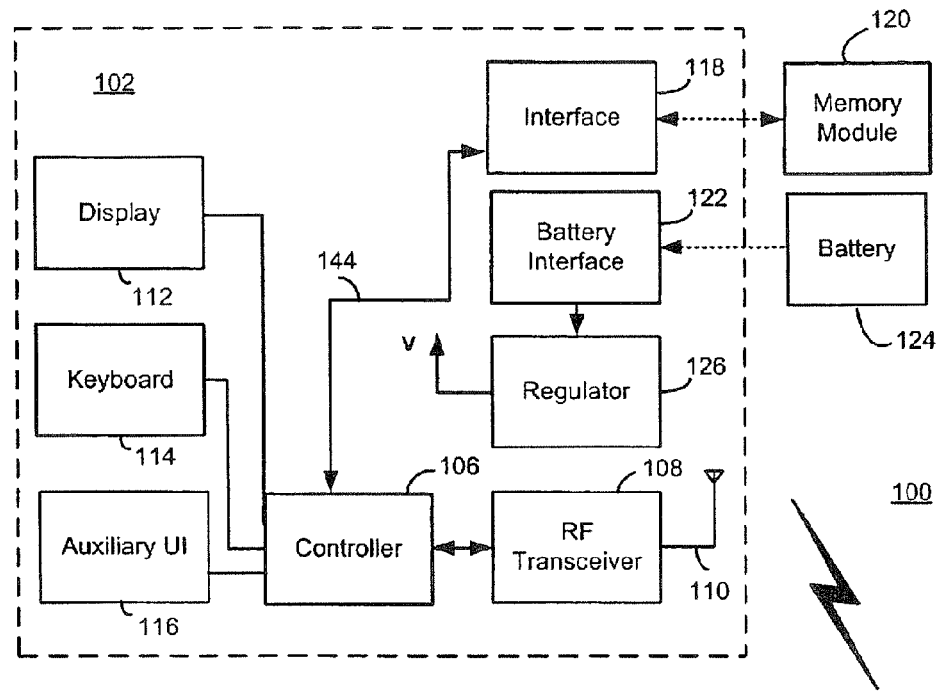
FIG. 1 is a block diagram which illustrates pertinent components of an example wireless communication network and a mobile station which communicates within this network.
Figure 1:
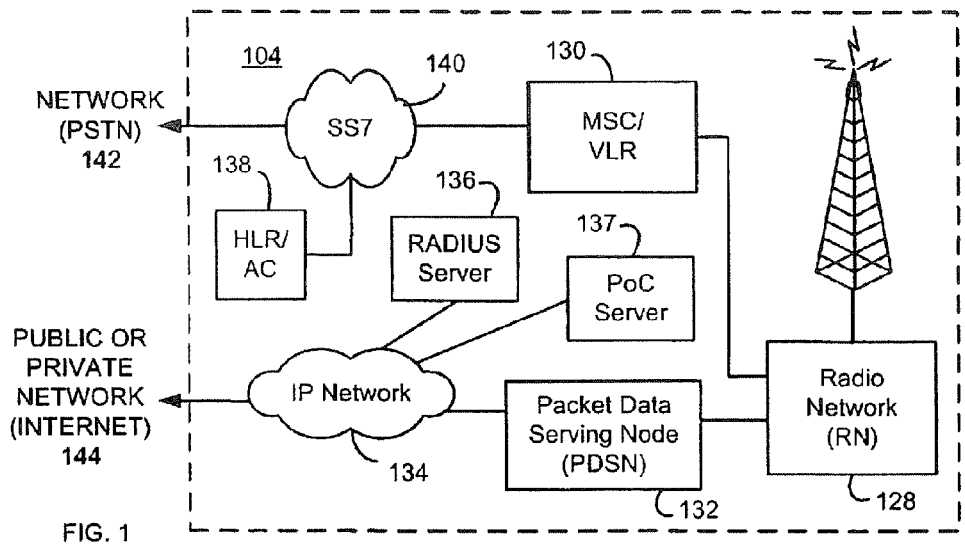

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Persons of ordinary skill in the art will appreciate that other networks and associated topologies including GPRS, E-GPRS and UMTS radio networks, among many others, may be employed with the teachings herein.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
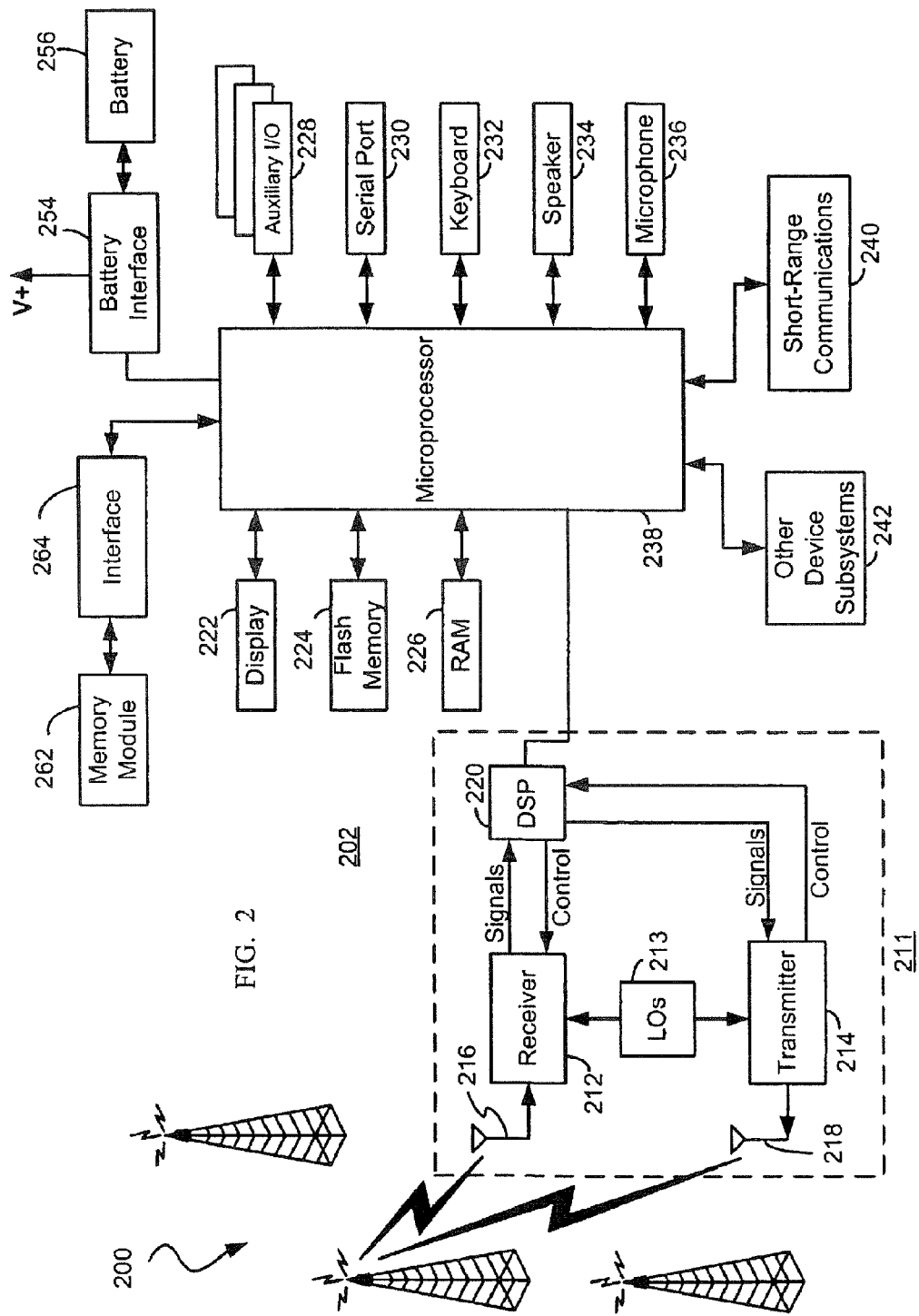
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Mobile station 202 may be adapted to provide instant messaging (IM) communications via programming instructions and data stored or otherwise available to the device 202. Instant messaging provides a conversational dialog typically involving the exchange of text messages between a user of device 202 and at least one other user of another device (not shown) adapted for IM communication. As persons of ordinary skill in the art will appreciate, an IM system or "presence and instant messaging system" allows users to subscribe to each other and be notified of changes in state (e.g. availability for instant message communication), and for users to send each other short instant messages. IM is discussed in further detail in "RFC 2778—A Model for Presence and Instant Messaging", maintained by the Internet Society and available at http://www.faqs.org/rfcs/rfc2778.html. As such adapted mobile station 202 provides a user agent for IM communication in an IM system.

Figure 10:
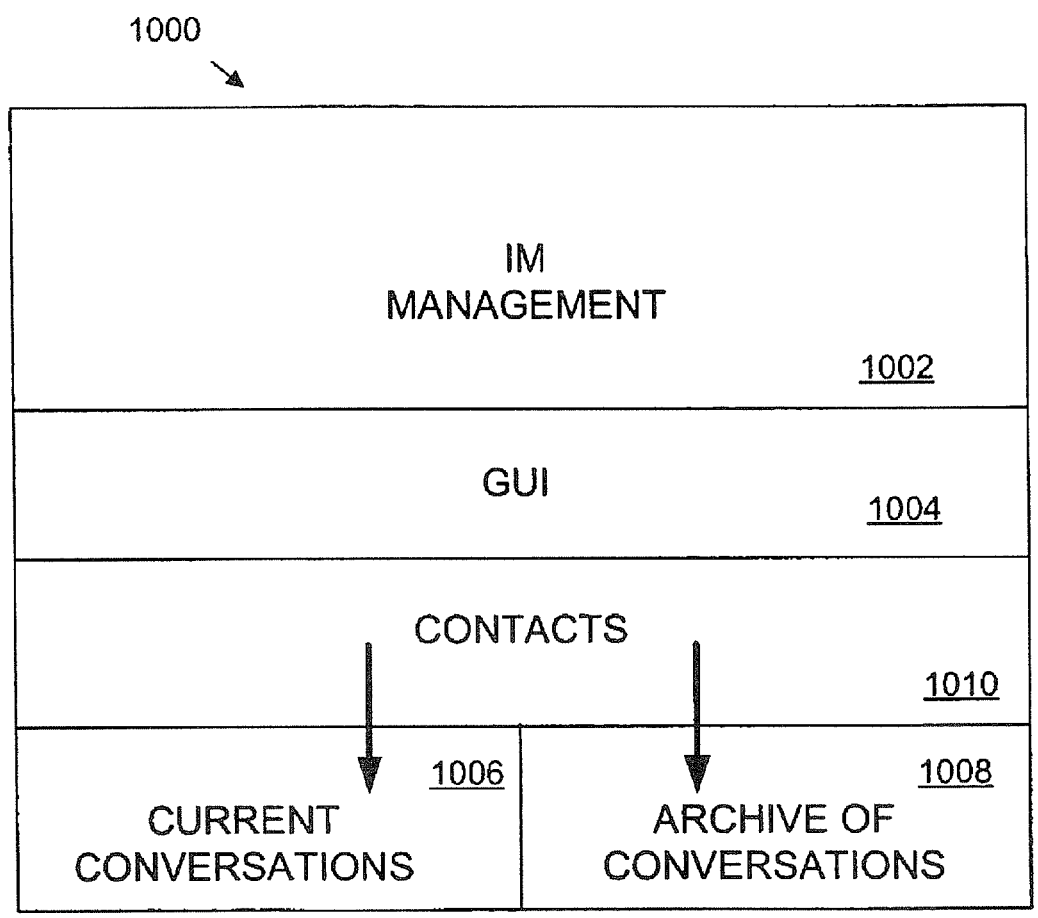
FIG. 10 is a block diagram of a portion of memory showing components of an IM application with IM conversation management in accordance with an embodiment.

FIG. 10 illustrates components 1000, typically comprising instructions and data that may be stored to flash memory 224 and/or RAM 226, for adapting station 202. Components 1000 comprise, broadly, IM management 1002, graphical user interface (GUI) 1004, contacts 1010, current conversations 1006 and archive of conversations 1008. IM management component 1002 provides presence and IM communication functions for the user (e.g. a user having the name "Mike") of the mobile station 202. GUI 1004 provides support for the interface for controlling aspects of the presence and IM functions using contacts 1010 to carry on current conversations 1006 and archive "old" conversations to archive 1008. As will be understood to those of ordinary skill in the art, it is sometimes difficult to make bright-line distinctions between components such as, IM management and GUI components 1002 and 1004. As well, it is understood that the components 1000 interface with other components (not shown) on or for mobile station 202 such as operating system, communication subsystem, PIM components etc.

Figure 3:
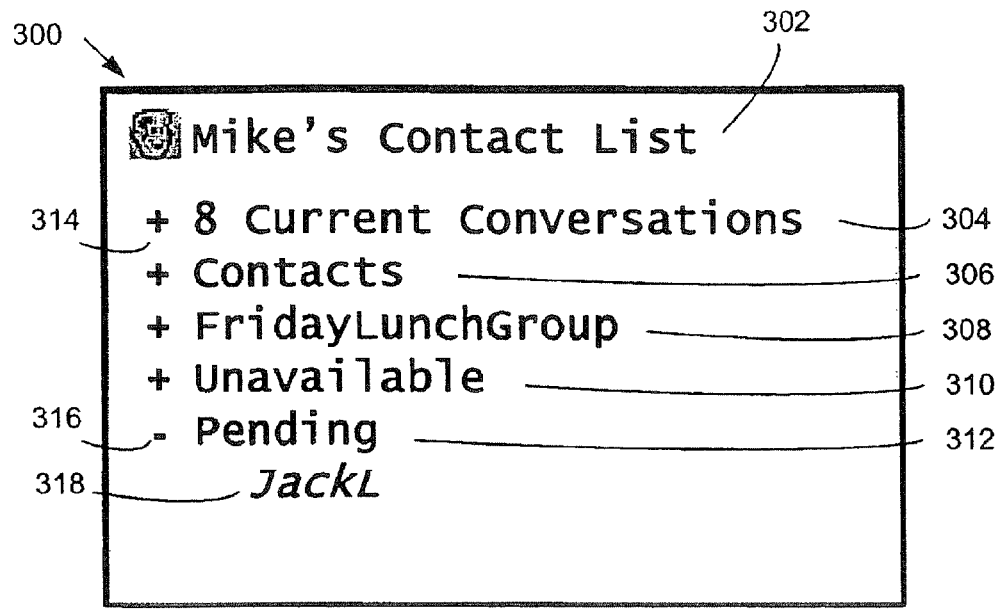
FIGS. 3-7 are representative GUI display views of a first embodiment of an IM application with IM conversation management.

FIG. 3 illustrates a representative view 300 of an IM screen provided by GUI 1002 for the IM application. The view 300 includes a title portion 302 showing "Mike's Contact List" and presents this user's list of contacts 306, 308, 310 and 312 and his current conversations 304. It will be understood that view 300 provides a hierarchical list in a form which permits expansion and contraction of list items via elements 314 ("+") and 316 ("−"). Contacts may comprise individual user contacts 306 or group contacts 308 (e.g. FridayLunchGroup) for assisting with the organization of contacts within the IM application. Contacts may also be grouped by presence information. Contact group 310 comprises a list of those contacts which are presently unavailable for IM communications while group 312 shows a list of those contacts who are pending the resolution of an invitation to join Mike's list of contacts in accordance with the subscription aspects of IM. View 300 of Mike's Contacts may be traversed by a user by moving a focus about the view to interact with various elements of the GUI such as the expansion elements or individual items of the list. The focus may be indicated in various ways such as by reverse video mode, etc. Traversal or other navigation my be facilitated by input devices such as arrow keys, wheel, pointing device, etc. Once a particular element is selected by a user of the mobile station 202, particular command options may be invoked. Options may be presented via one or more menus or invoked through predefined keystrokes etc. common in the art.

Figure 4:
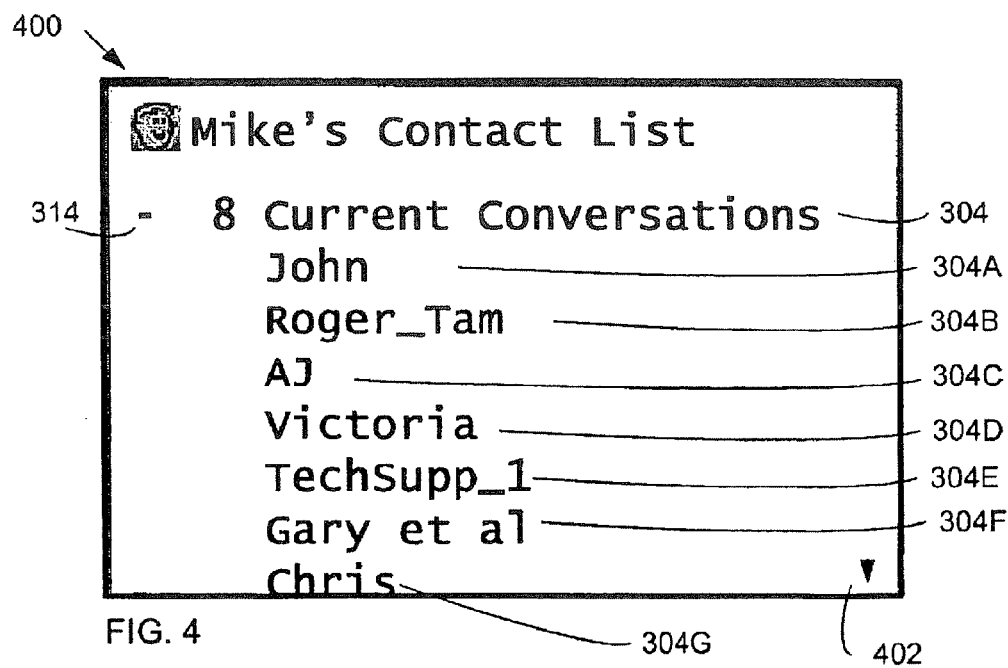

FIG. 4 illustrates a representative IM view 400 in which the current conversations 304 list element of FIG. 3 has been expanded to show individual list elements 304A-304G comprising specific conversations. Navigational element 314 of FIG. 4 indicates that the list of conversations may be contracted while navigational element 402 indicates that additional list items (e.g. conversations and contacts) appear off screen below. It is apparent that when a long list of current conversations is maintained by IM management and GUI components 1002 and 1004, the list may be too long to be wholly displayed on a relatively small display screen of the mobile station 202. Persons of ordinary skill in the art will further appreciate that IM application GUI's for other devices such as a desktop computer typically run in a small window on such devices to minimize intrusion. As such, navigating longer lists of conversations is necessary to see each entry.

However, it is often true that when a long list of current conversations exists on a user device, at least some of the conversations are not current. The users have stopped communicating but not actively instructed the IM application to close the conversation. In accordance with a feature of the present embodiment, the IM management component is adapted to archive a particular current conversation if such remains idle (e.g. no message traffic) for a minimum period of time and preferably, but not necessarily, there are no unread messages.

Figure 5:
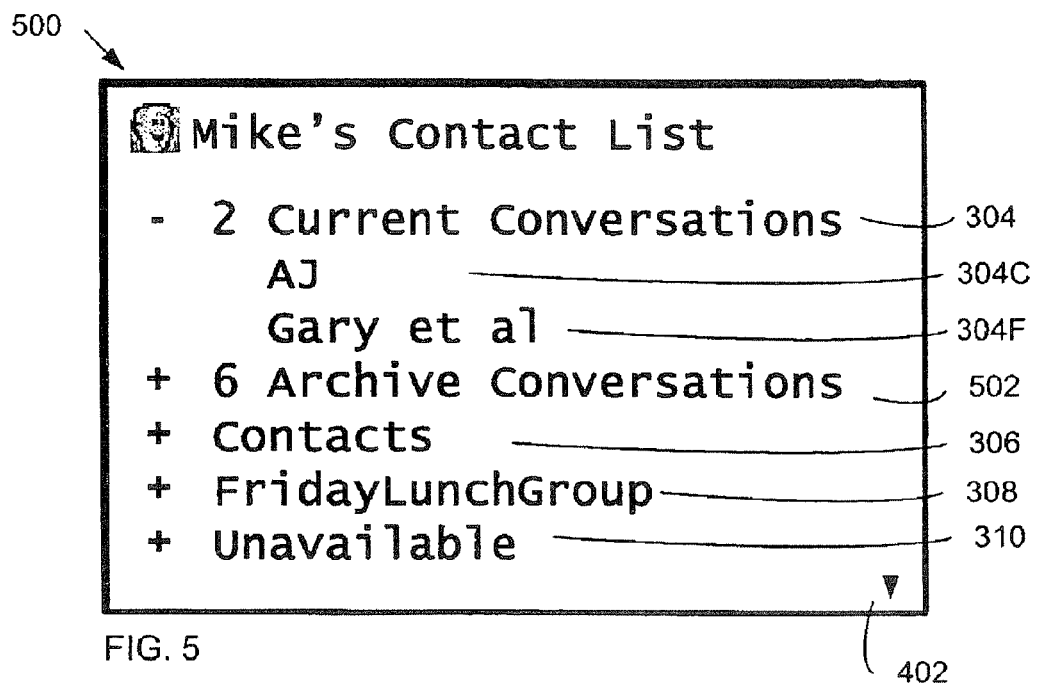
Figure 6:
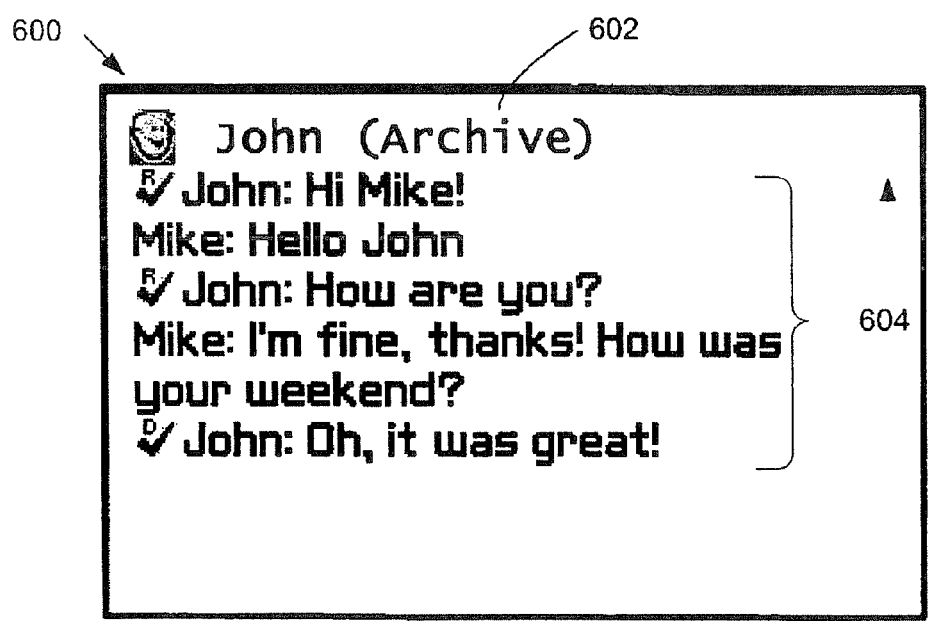

FIG. 5 shows an embodiment of the IM application in which the GUI presents an additional list element 502 for archive conversations. Current conversations 304 are reduced to two instances 304C and 304F from FIG. 4. Representative view 500 provides one manner of showing the archive of conversations 1008 and accessing same through the list navigation features of the GUI component 1004. A user may traverse the list, expand element 502 and select a conversation from the archive for viewing. FIG. 6 presents a representative view 600 of an archive conversation 304A between Mike and a contact "John". The view 600 presents a view description 602 and shows a plurality of IM messages 604 in the conversation. The messages in the archive may be navigated such as by moving the focus up and down the screen (not shown).

Preferably, all or one or more portions of the archived conversation may be selected for saving by a user (not shown). It is anticipated that such information will often comprise reference-type information like directions to a particular address, a phone number, etc. The saving feature may interface with PIM or other application components of mobile station 202 to facilitate saving to an address book of contacts or as an address attachment, a memopad or other feature of a PIM. Alternatively, the conversation may be saved into a message list typically comprising an integration of incoming and outgoing communications and notifications (e.g. email, voicemail, missed calls etc.) maintained by the PIM.

Figure 7:
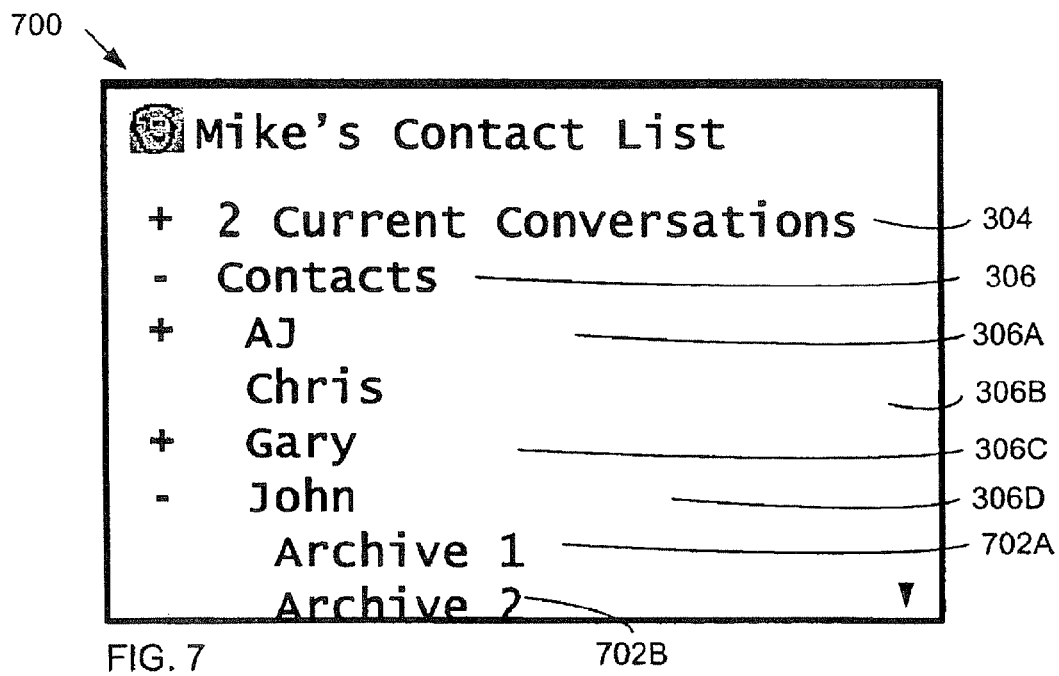
Figure 8:
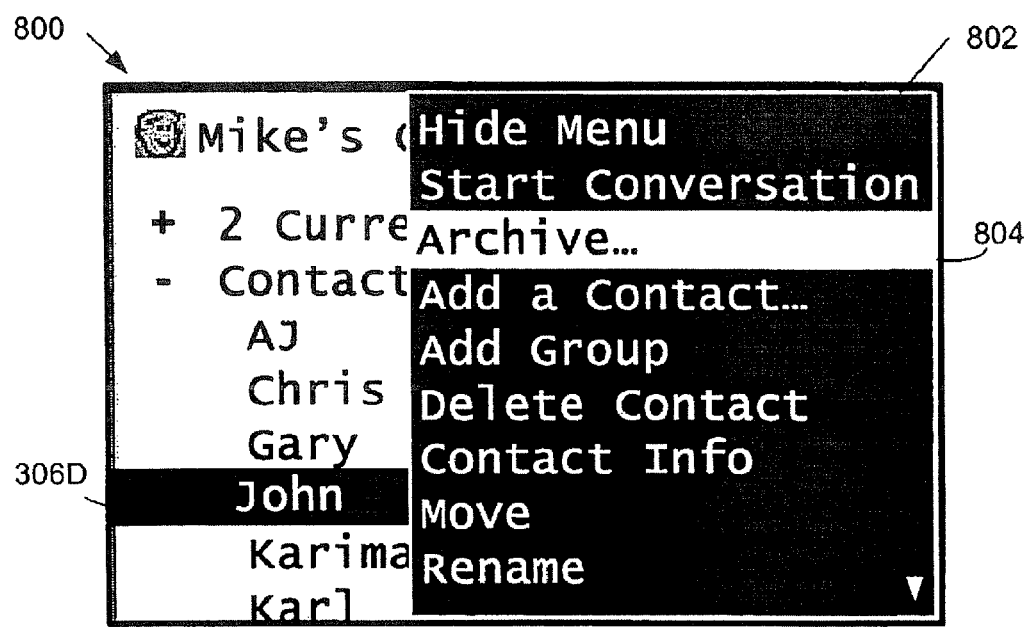
FIG. 8 is a representative GUI display view in accordance with a second embodiment.

Alternatively or additionally to the manner of presenting the archive of conversations shown by FIG. 5, FIG. 7 shows a view 700 for presenting specific archived conversations through an association with the contact with which the conversation was conducted. The list element for individual contacts 306 is shown expanded to present a plurality of individual contacts 306A-306D. An individual contact having an archived conversation (e.g. 306A or 306D) may be expanded to list the archived conversation for the contact. Contact 306D is shown expanded and having two conversations 702A and 702B. The list may be navigated as discussed and a particular archive opened for viewing such as is shown in FIG. 6. FIG. 8 shows another embodiment of a view 800 for presenting the archive of conversations by contact to show a history of conversations. A focus may be moved to a contact such as 306D and a menu 802 invoked to select a menu option 804 for the archive for the contact. A further menu may be displayed (not shown) to facilitate selection among various archived conversations for the contact or to invoke different archive options. Such options may include saving the conversation, deleting an archived conversation etc.

IM management component 1002 may be adapted to automatically maintain the archive of conversations 1008 to keep resource consumption to a defined limit or to free resources for other use. IM management may remove (i.e. delete) conversations from the archive when the archive reaches a predefined size (e.g. relative to total space used or number of conversations archived etc.). In accordance with a preference, older archives may be removed first but different strategies may be involved (largest first, least reviewed archives first, least frequented contacts first) including prompting for user choice. Optionally, the size limits for the archive and/or the idle time may be user configurable.

Figure 9A:
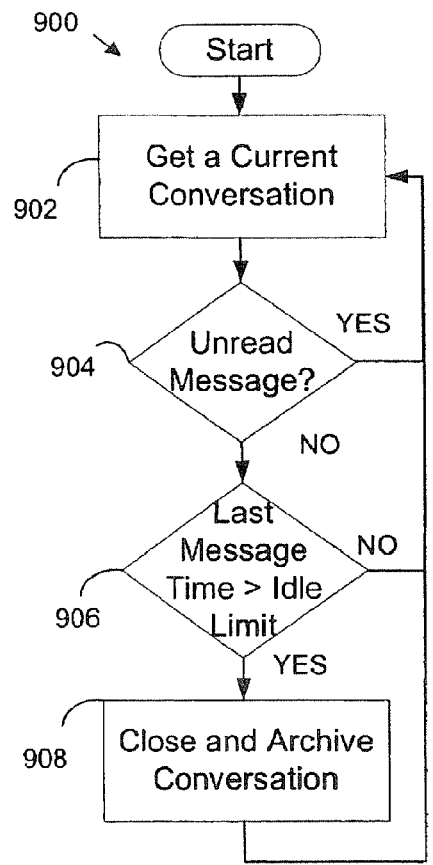
FIGS. 9A and 9B are flow diagrams showing operations for IM conversation management in an IM application in accordance with an embodiment.
Figure 9B:
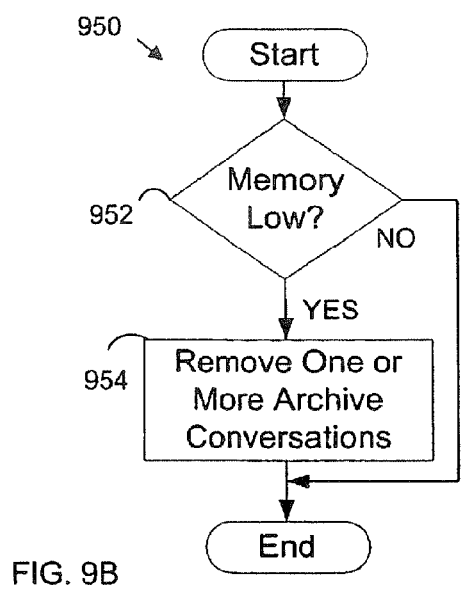

FIGS. 9A and 9B illustrate operations 900 and 950 for IM management for managing current conversations 1006 and archive 1008. Operations 900 determine whether to move to the archive of conversations 1008 particular conversations of current conversations 1006. These operations may be executed periodically.

To archive a current conversation, the list of current conversations is examined (typically sequentially) at step 902. At step 904, if a current conversation has an unread message it is preferably not archived so operations return to step 902 for another current conversation. Otherwise a step 906, if the current conversation is not idle for a predetermined time (e.g. the last message time of receipt is not greater than a threshold), operations again return to step 902. If the conversations is idle and does not have an unread message, the conversation is removed from the list of current conversations and preferably moved to the archive 1008. Optionally, (not shown) the conversation may be deleted with or without user confirmation. The current conversation is preferably closed in accordance with IM protocols as may be applicable.

Various storage schemes (e.g. linked lists) and memory allocation schemes for conversations may be employed and moving from a current list to an archive may be done in a variety of ways. The current and archived conversations may share the same physically memory space. A flag or other structure may indicate current vs. archive status for a conversation. Another flag could indicate that conversation is to be kept indefinitely as determined by a user save for example. Moving a conversation to the archive may include determining size limits for the archive and maintaining the archive as discussed, removing one or more other archived conversations to permit the move (not shown). Particular conversations may be linked to specific contacts 1010 via pointers or other known techniques for associating one structure with another.

FIG. 9B shows representative operations for removing archived conversations to free shared resources when available memory (e.g. flash memory or other persistent store) is low. A low memory determination is made at step 952 and in response, one or more archived conversations may be removed from the archive (step 954). Low memory may be determined by other components than the IM components (such as the operating system) and IM management component 1002 may provide an interface to request that archive conversations be removed.

The above-described embodiments are intended to be examples only. Those of skill in the art may effect alterations, modifications and variations to the particular embodiments without departing from the scope of the application. The subject matter described in the recited claims intends to cover and embrace all suitable changes in technology.

The invention claimed is:

1. A method of operating a communications device, the method comprising:
    maintaining a first list of at least one instant messaging conversation in a graphical user interface for engaging in a plurality of instant messaging conversations;
    monitoring conversation activity for the instant messaging conversations in the first list;
    automatically removing a particular instant messaging conversation from the first list after an idle period of conversation activity and only if all messages of the particular conversation have been read;
    archiving the particular instant messaging conversation to an instant messaging conversation archive for making the particular instant messaging conversation accessible via the graphical user interface;
    providing a second list of at least one archived instant messaging conversation in said graphical user interface separate from said first list for accessing archived conversations of the instant messaging conversation archive; and
    removing at least one instant messaging conversation from the second list.

2. The method of claim 1, the at least one instant messaging conversation being automatically removed from the second list in response to a size limit for the archive.

3. The method of claim 2, wherein the automatically removing one or more archived instant messaging conversations from the second list is prioritized according to one or more of the following criteria: oldest, largest, least reviewed, least frequented.

4. The method of claim 2, wherein the size limit corresponds to either total space consumed or total number of archived instant messaging conversations.

5. The method of claim 2, further comprising providing a prompt prior to automatically removing one or more archived instant messaging conversations from the second list.

6. The method according to claim 2, further comprising enabling the size limit to be user configurable.

7. The method of claim 1, further comprising enabling all or one or more portions of the archived IM conversations to be saved to a persistent store.

8. The method of claim 7, the at least one instant messaging conversation being removed upon being saved to the persistent store.

9. The method of claim 1, the removing comprising deleting an oldest conversation first.

10. A non-transitory computer readable storage medium comprising computer executable instructions for operating a communications device, the computer executable instructions comprising instructions for:
maintaining a first list of at least one instant messaging conversation in a graphical user interface for engaging in a plurality of instant messaging conversations;
monitoring conversation activity for the instant messaging conversations in the first list;
automatically removing a particular instant messaging conversation from the first list after an idle period of conversation activity and only if all messages of the particular conversation have been read;
archiving the particular instant messaging conversation to an instant messaging conversation archive for making the particular instant messaging conversation accessible via the graphical user interface;
providing a second list of at least one archived instant messaging conversation in said graphical user interface separate from said first list for accessing archived conversations of the instant messaging conversation archive; and
removing at least one instant messaging conversation from the second list.

11. The non-transitory computer readable storage medium of claim 10, the at least one instant messaging conversation being automatically removed from the second list in response to a size limit for the archive.

12. The non-transitory computer readable storage medium of claim 11, wherein the automatically removing one or more archived instant messaging conversations from the second list is prioritized according to one or more of the following criteria: oldest, largest, least reviewed, least frequented.

13. The non-transitory computer readable storage medium of claim 11, wherein the size limit corresponds to either total space consumed or total number of archived instant messaging conversations.

14. The non-transitory computer readable storage medium of claim 11, further comprising instructions for providing a prompt prior to automatically removing one or more archived instant messaging conversations from the second list.

15. The non-transitory computer readable storage medium according to claim 11, further comprising instructions for enabling the size limit to be user configurable.

16. The non-transitory computer readable storage medium of claim 10, further comprising instructions for enabling all or one or more portions of the archived IM conversations to be saved to a persistent store.

17. The non-transitory computer readable storage medium of claim 16, the at least one instant messaging conversation being removed upon being saved to the persistent store.

18. The non-transitory computer readable storage medium of claim 10, the removing comprising instructions for deleting an oldest conversation first.

19. A communications device comprising a processor and memory, the memory comprising computer executable instructions for operating the communications device, the computer executable instructions comprising instructions for:
maintaining a first list of at least one instant messaging conversation in a graphical user interface for engaging in a plurality of instant messaging conversations;
monitoring conversation activity for the instant messaging conversations in the first list;
automatically removing a particular instant messaging conversation from the first list after an idle period of conversation activity and only if all messages of the particular conversation have been read;
archiving the particular instant messaging conversation to an instant messaging conversation archive for making the particular instant messaging conversation accessible via the graphical user interface;
providing a second list of at least one archived instant messaging conversation in said graphical user interface separate from said first list for accessing archived conversations of the instant messaging conversation archive; and
removing at least one instant messaging conversation from the second list.

20. The communications device of claim 19, the at least one instant messaging conversation being automatically removed from the second list in response to a size limit for the archive.

21. The communications device of claim 20, wherein the automatically removing one or more archived instant messaging conversations from the second list is prioritized according to one or more of the following criteria: oldest, largest, least reviewed, least frequented.

22. The communications device of claim 20, wherein the size limit corresponds to either total space consumed or total number of archived instant messaging conversations.

23. The communications device of claim 20, further comprising instructions for providing a prompt prior to automatically removing one or more archived instant messaging conversations from the second list.

24. The communications device according to claim 20, further comprising instructions for enabling the size limit to be user configurable.

25. The communications device of claim 19, further comprising instructions for enabling all or one or more portions of the archived IM conversations to be saved to a persistent store.

26. The communications device of claim 25, the at least one instant messaging conversation being removed upon being saved to the persistent store.

27. The communications device of claim 19, the removing comprising instructions for deleting an oldest conversation first.

* * * * *